United States Patent [19]

Thornton

[11] 4,135,040

[45] Jan. 16, 1979

[54] SOLID ION-CONDUCTIVE ELECTROLYTE BODY AND METHOD OF FORMING

[75] Inventor: Roy F. Thornton, Schenectady, N.Y.

[73] Assignee: General Electric Company, Schenectady, N.Y.

[21] Appl. No.: 862,535

[22] Filed: Dec. 20, 1977

[51] Int. Cl.² .............................................. H01M 6/18
[52] U.S. Cl. ..................................... 429/191; 429/104
[58] Field of Search ....................... 429/30, 31, 32, 33, 429/104, 191, 192, 193, 105, 112

[56] References Cited

U.S. PATENT DOCUMENTS

| | | | |
|---|---|---|---|
| 3,879,220 | 4/1975 | Will et al. | 429/192 |
| 3,953,233 | 4/1976 | Roth et al. | 429/193 |
| 3,960,596 | 6/1976 | Mitoff et al. | 429/105 |
| 4,041,220 | 8/1977 | Armand | 429/191 |

FOREIGN PATENT DOCUMENTS 2514034  9/1976  Fed. Rep. of Germany ............. 429/30

*Primary Examiner*—Donald L. Walton
*Attorney, Agent, or Firm*—Paul R. Webb, II; Joseph T. Cohen; Leo I. MaLossi

[57] ABSTRACT

A solid ion-conductive electrolyte body has a solid ion-conductive electrolyte portion with opposite major faces, and a textured surface on at least one major face providing an increased surface area. A method is disclosed also forming a solid ion-conductive electrolyte body with an increased surface area.

5 Claims, 5 Drawing Figures

SOLID ION-CONDUCTIVE ELECTROLYTE BODY AND METHOD OF FORMING

The present invention relates to a solid ion-conductive electrolyte body and to a method of forming, and more particularly to such a solid ion-conductive electrolyte body with an increased surface area and to a method of forming.

Solid ion-conductive electrolytes are useful in electrochemical cells. Such cells include sodium-sulfur cells, sodium-halogen cells, lithium anode type cells, and solid state cells. A sodium-sulfur cell is described, for example in Mitoff et al. U.S. Pat. No. 3,960,596. A solid sodium ion-conductive electrolyte material in the form of a casing with one open end is employed. A sodium-halogen cell is described in Will et al. U.S. Pat. No. 3,879,220. A solid sodium ion-conductive electrolyte material in a disc configuration is employed. A lithium-sulfur monochloride cell is described in Roth et al. U.S. Pat. No. 3,953,233. A lithium-sodium aluminate electrolyte in the form of a casing with an open end is employed. The above patents are assigned to the same assignee as the present application.

My present invention is directed to an improved solid ion-conductive electrolyte body with a textured surface which is useful in the above types of cells.

The primary object of my invention is to provide a solid ion-conductive electrolyte body with an increased surface area.

In accordance with one aspect of my invention, a solid ion-conductive electrolyte body has a solid ion-conductive electrolyte portion with opposite major faces, and a textured surface on at least one major face of the body thereby providing an increased surface area.

These and various other objects, features, and advantages of the invention will be better understood from the following description taken in connection with the accompanying drawing in which.

Figure 1:
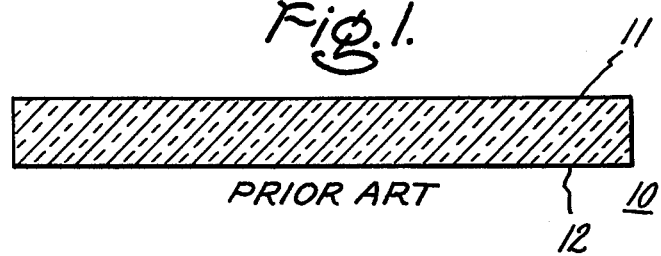
FIG. 1 is a sectional view of a prior art solid ion-conductive electrolyte body.
Figure 2:
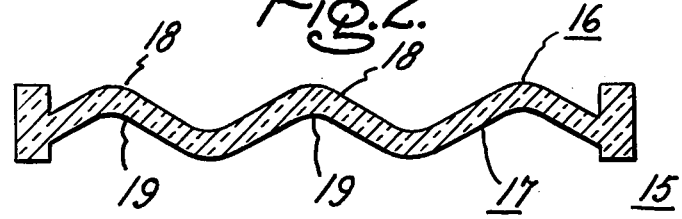
FIG. 2 is a sectional view of a solid ion-conductive electrolyte body made in accordance with my invention.

In FIG. 1 of the drawing, there is shown generally at 10 a prior art solid ion-conductive electrolyte body in the form of a disc. Body 10 has opposite major faces 11 and 12 both of which have planar or smooth surfaces. The body is shown as made of sodium beta-alumina. In FIG. 2 of the drawing, there is shown generally at 15 a solid ion-conductive electrolyte body in disc form made in accordance with my invention. Body 15 has opposite major faces 16 and 17, both of which are textured by a plurality of dimples 18 and depressions 19 resulting in a corrugated configuration.

Figure 3:
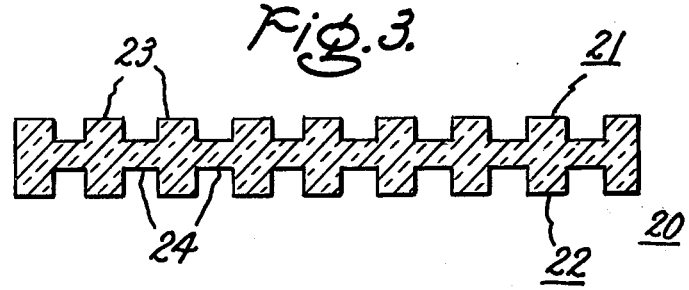
FIG. 3 is a sectional view of a modified solid ion-conductive electrolyte body.

In FIG. 3 of the drawing, there is shown generally at 20 a solid ion-conductive electrolyte body in disc form made in accordance with my invention. Body 20 has opposite major faces 21 and 22, both of which are textured by alternating segments 23 and grooves 24.

Figure 4:
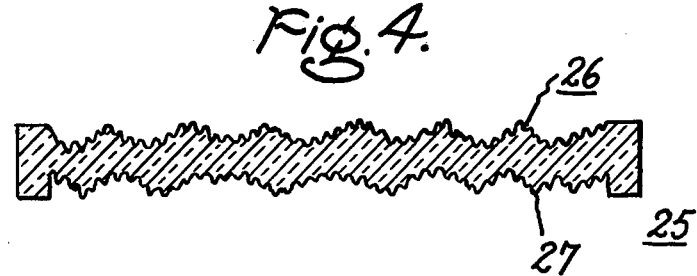
FIG. 4 is a sectional view of a further modified solid ion-conductive electrolyte body.

In FIG. 4 of the drawing, there is shown generally at 25 a solid ion-conductive electrolyte body in disc form made in accordance with my invention. Body 25 has opposite major faces 26 and 27, both of which are textured by being abraded.

Figure 5:
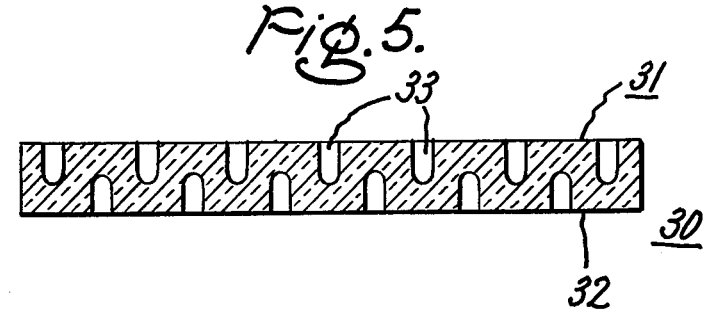
FIG. 5 is a sectional view of a still further modified solid ion-conductive electrolyte body.

In FIG. 5 of the drawing, there is shown generally at 30 a solid ion-conductive electrolyte body in disc form made in accordance with my invention. Body 30 has opposite major faces 31 and 32, both of which are textured by spaced apart bores 33.

Presently solid ion-conductive electrolyte bodies, which are employed in various types of electrochemical cells, have opposite major faces which have planar or smooth surfaces. In electrochemical cells, hindered ion transport at the planar surface interfaces of these solid ion-conductive electrolyte bodies can dominate cell resistance. The effect of this hindered ion transport can be reduced by increased surface area by texturing the former planar or smooth surfaces. At least one planar surface should be textured while if necessary or desirable both planar surfaces can be textured.

The texturing of the planar surface can be done in various manners to increase the surface area of the major face or faces. Such texturing can be accomplished, for example, by providing on one or both faces a plurality of alternating dimples and depressions, alternating segments and grooves, an abraded face, a corrugated configuration, or a plurality of spaced apart bores. Such texturing can be done to an existing solid ion-conductive electrolyte body. Further, such texturing can be accomplished prior to the sintering of the solid ion-conductive electrolyte material to form the body. Further the texturing of at least one major face of the body can be applied to increase the surface area of various solid ion-conductive electrolyte shapes. While reference and discussion has been made to such solid ion-conductive electrolyte bodies in disc shapes, various other configurations are suitable, such as, cups, rings, tubes, and rectangular plates.

I can form a solid ion-conductive electrolyte body which comprises a solid ion-conductive electrolyte portion with opposite major faces and a textured surface on at least one major face of the body thereby providing an increased surface area. Such a solid ion-conductive electrolyte body with an increased surface area can be formed by providing a solid ion-conductive electrolyte body with opposite major faces, and texturing the surface of at least one major face of the body. It will, of course, be appreciated that both major faces of the body can be textured if necessary or desirable. Such a solid ion-conductive electrolyte body with an increased surface area can also be formed by providing a green compact of solid ion-conductive electrolyte material with opposite major faces, texturing the surface of at least one major face of the material, and sintering the material to form a solid ion-conductive electrolyte body.

When a solid ion-conductive electrolyte portion with opposite major faces is employed, a surface may be textured by slotting one or both major faces resulting in alternating segments and grooves on one or both of these faces. One or both of the opposite major faces can be in an abraded condition by etching, abrading, or grit blasting one or both faces. One or both of the opposite major faces can also be bored resulting in a plurality of spaced apart bores.

When a green compact of the solid ion-conductive electrolyte material with opposite major faces is employed initially, the above types of texturing can be accomplished in the surface of one or both of the opposite major faces, for example, by molding or compacting in a suitable mold or dye to form the desired surface configuration. The green compact is then sintered to form the solid ion-conductive electrolyte body with the textured surface.

Various solid ion-conductive electrolyte materials or bodies can be employed in my invention. Suitable solid ion-conductive electrolyte materials and bodies include beta-alumina, which term is used in the present application to include beta-alumina, beta"-alumina, mixtures thereof, and related compounds. Suitable beta-aluminas include lithium beat-alumina, sodium beta-alumina, lithium-sodium beta-alumina, hydronium beta-alumina, hydronium beta"-alumina, and silver beta-alumina. Other electrolytes include those, for example, based on silver, such as silver iodide, or silver rubidium iodide, or on lithium, such as, lithium iodide.

In accordance with my invention, a solid ion-conductive electrolyte body has a solid sodium ion-conductive electrolyte portion with opposite major faces and a textured surface on at least one major face of the body thereby providing an increased surface area. This body is formed by providing a solid sodium ion-conductive electrolyte body with opposite major faces, and texturing the surface of at least one major face of the body. Such texturing is accomplished by slotting with a suitable tool one major face of the body thereby resulting in alternating segments and grooves on that major face of the body.

A similar solid ion-conductive electrolyte body is made by forming a green compact of solid sodium ion-conductive electrolyte material with opposite major faces, texturing the surface of at least one major face of the material, and sintering the material to form a solid sodium ion-conductive electrolyte body. The one major face of the material is textured by employing a suitable mold to form alternating segments and grooves on the one major face of the material. Subsequently, the material is sintered to form a solid sodium ion-conductive electrolyte body.

The above resulting structures and methods are made in accordance with my invention.

Examples of solid ion-conductive electrolyte bodies and methods of forming such bodies in accordance with my invention are set forth below:

EXAMPLE I

A solid ion-conductive electrolyte body is formed by providing a solid sodium ion-conductive electrolyte body in disc shape with opposite major faces. The surface of one major face of the body is slotted by a suitable tool thereby texturing the surface resulting in alternate segments and grooves on that major face of the body. The resulting body is a solid ion-conductive electrolyte body made in accordance with my invention.

EXAMPLE II

A solid ion-conductive electrolyte body is formed by providing a solid sodium ion-conductive electrolyte body in disc shape with opposite major faces. The surface of one major face of the body is grit blasted with conventional apparatus thereby texturing the surface resulting in an abraded surface for that major face of the body. The resulting body is a solid ion-conductive electrolyte body made in accordance with my invention.

EXAMPLE III

A solid ion-conductive electrolyte body is formed from a green compact of solid sodium ion-conductive electrolyte material in disc shape with opposite major faces. The green compact is placed in a mold in which portions of both surfaces of the major faces are depressed uniformily thereby texturing the surfaces resulting in a corrugated configuration for the compact. The compact is then sintered in a conventional manner to form a solid ion-conductive electrolyte body made in accordance with my invention.

EXAMPLE IV

A solid ion-conductive electrolyte body is formed in a green compact of solid sodium ion-conductive electrolyte material in disc shape with opposite major faces. The green compact is placed in a mold in which the surfaces of both major faces are forced into a plurality of alternating dimples and depressions thereby texturing both surfaces. The compact is then sintered in a conventional manner to form a solid ion-conductive electrolyte body made in accordance with my invention.

While other modifications of the invention and variations thereof which may be employed within the scope of the invention have not been described, the invention is intended to include such as may be embraced within the following claims.

What I claim as new and desire to secure by Letters Patent of the United States is:

1. A solid ion-conductive electrolyte body comprises a solid ion-conductive electrolyte portion with opposite major faces, a textured surface on at least one major face of the body thereby providing an increased surface area, and the textured surface with a plurality of alternating dimples and depressions.

2. A solid ion-conductive electrolyte body comprises a solid ion-conductive electrolyte portion with opposite major faces, a textured surface on at least one major face of the body thereby providing an increased surface area, and the textured surface with a plurality of spaced apart bores.

3. A method of forming a solid ion-conductive electrolyte body with an increased surface area which comprises a green compact of solid ion-conductive electrolyte material with opposite major faces, texturing the surface of at least one major face of the material, and sintering the material to form a solid ion-conductive electrolyte body.

4. A method of forming a solid ion-conductive electrolyte body with an increased surface area which comprises providing a solid ion-conductive electrolyte portion with opposite major faces, texturing the surface of at least one major face of the body with a plurality of alternating dimples and depressions.

5. A method of forming a solid ion-conductive electrolyte body with an increased surface area which comprises providing a solid ion-conductive electrolyte portion with opposite major faces, and texturing the surface of at least one major face of the body with a plurality of spaced apart bores.

* * * * *